United States Patent
Rojer

(10) Patent No.: US 8,244,753 B2
(45) Date of Patent: Aug. 14, 2012

(54) BOOKMARK-GUIDED, TAXONOMY-BASED, USER-SPECIFIC DISPLAY OF SYNDICATION FEED ENTRIES USING NATURAL LANGUAGE DESCRIPTIONS IN FOREGROUND AND BACKGROUND CORPORA

(76) Inventor: Alan S Rojer, Maplewood, NJ (US)

( * ) Notice: Subject to any disclaimer, the term of this patent is extended or adjusted under 35 U.S.C. 154(b) by 205 days.

(21) Appl. No.: 12/456,661

(22) Filed: Jun. 19, 2009

(65) Prior Publication Data
US 2010/0325120 A1  Dec. 23, 2010

(51) Int. Cl.
*G06F 7/00* (2006.01)
*G06F 17/30* (2006.01)
(52) U.S. Cl. ........................ 707/769; 707/759
(58) Field of Classification Search .................. 707/759, 707/769, 999.107
See application file for complete search history.

(56) References Cited

U.S. PATENT DOCUMENTS

| | | | | |
|---|---|---|---|---|
| 2005/0038717 A1* | 2/2005 | McQueen et al. | ............... | 705/27 |
| 2006/0129917 A1* | 6/2006 | Volk et al. | ..................... | 715/513 |
| 2006/0248209 A1* | 11/2006 | Chiu et al. | ..................... | 709/231 |
| 2006/0253459 A1* | 11/2006 | Kahn et al. | ............... | 707/999.01 |
| 2007/0043745 A1* | 2/2007 | Rojer | .......................... | 707/999.1 |
| 2007/0174255 A1* | 7/2007 | Sravanapudi et al. | . | 707/999.003 |

* cited by examiner

*Primary Examiner* — Apu Mofiz
*Assistant Examiner* — Bryan Walker

(57) ABSTRACT

A method for user-specific display of syndication feed entries uses a taxonomy, a user-specific foreground corpus of bookmarks, and a background corpus of feed entries. User-specific book-marks are received. Each bookmark provides a natural-language description characterizing a bookmark resource. The natural-language descriptions are classified to determine one or more bookmark topics for each bookmark. The topics are maintained in the taxonomy. The bookmark topics are each associated with accumulators in the user-specific foreground corpus. Each book-mark is accumulated to the accumulators corresponding to each of its topics. Feed syndication entries are received and similarly classified according to associated natural-language descriptions. Entry topics are associated with accumulators in the background corpus. A user-specific weight is determined for each entry by aggregating the accumulators corresponding to the entry topics for the foreground and background corpora. The entries are displayed for a specific user in order of declining user-specific weight.

1 Claim, 5 Drawing Sheets

Fig. 3

```
struct Corpus^1044 {
  Accumulator^1048 require_accumulator^1046(Topic^1052 topic^1050);
  Map<Topic^1052, Accumulator^1048> accumulator^1054;
  size_t cardinality^1056;
  Set<Item^1060> items^1058;
}
```

Fig. 4

```
struct Feed^1062 {
  Set<Entry^1066> entries^1064;
}
```

Fig. 5

```
struct Topic^1052 {
  Set<Topic^1052> genera^1068;
  Set<Topic^1052> species^1070;
}
```

Fig. 6

```
struct Item^1060 {
  Description^1074 description^1072;
  Resource^1078 resource^1076;
}
```

Fig. 7

```
struct Entry^1066: public Item^1060 {
  double weight^1080;
  Feed^1062 feed^1082;
}
```

Fig. 8

```
struct Bookmark^1084: public Item^1060 {
  User^1088 user^1086;
}
```

*Fig. 9*

```
struct Accumulator¹⁰⁴⁸ {
  Set<Item¹⁰⁶⁰> items¹⁰⁹⁰;
  size_t cardinality¹⁰⁹²;
  Topic¹⁰⁵² topic¹⁰⁹⁴;
}
```

*Fig. 10*

```
struct User¹⁰⁸⁸ {
  Corpus¹⁰⁴⁴ foreground¹⁰⁹⁶;
  Set<Feed¹⁰⁶²> subscriptions¹⁰⁹⁸;
}
```

*Fig. 11*

```
struct Description¹⁰⁷⁴ {
  Set<Topic¹⁰⁵²> classification¹¹⁰⁰;
  Sequence<Span¹¹⁰⁴> segmentation¹¹⁰²;
  Text text¹¹⁰⁶;
}
```

*Fig. 12*

```
struct Span¹¹⁰⁴ {
  Text text¹¹⁰⁸;
  Topic¹⁰⁵² topic¹¹¹⁰;
}
```

*Fig. 13*

```
struct Resource¹⁰⁷⁸ {
  Text uri¹¹¹²;
}
```

*Fig. 14*

```
struct Host¹¹¹⁴ {
  Corpus¹⁰⁴⁴ background¹¹¹⁶;
  Set<Feed¹⁰⁶²> feeds¹¹¹⁸;
  void poll¹¹²⁰(Feed¹⁰⁶² poll_feed¹¹²²);
  void classify¹¹²⁴(Item¹⁰⁶⁰ subject¹¹²⁸, Set<Topic¹⁰⁵²> topics¹¹³⁰);
  Text user_feed_link¹¹³²(User¹⁰⁸⁸ link_user¹¹³⁴, Feed¹⁰⁶² link_feed¹¹³⁶);
  Text entry_title_link¹¹³⁸(User¹⁰⁸⁸ link_entry¹¹⁴⁰);
  Text span_topic_link¹¹⁴²(Topic¹⁰⁵² span_topic¹¹⁴⁴);
  Text user_topic_link¹¹⁴⁶(User¹⁰⁸⁸ link_user¹¹⁴⁸, Topic¹⁰⁵² link_topic¹¹⁵⁰);
  Set<User¹⁰⁸⁸> users¹¹⁵²;
  Set<Topic¹⁰⁵²> taxonomy¹¹²⁶;
}
```

Fig. 15

```
void publish¹¹⁵⁴(Host¹¹¹⁴ host¹¹⁵⁶)
{
    ¹¹⁵⁸Corpus¹⁰⁴⁴ back¹¹⁶⁰ = host¹¹⁵⁶.background¹¹¹⁶;
    ¹¹⁶²foreach(Feed¹⁰⁶² feed¹¹⁶⁴ in host¹¹⁵⁶.feeds¹¹¹⁸) {
        ¹¹⁶⁶poll¹¹²⁰(feed¹¹⁶⁴);
        ¹¹⁶⁸foreach(Entry¹⁰⁶⁶ entry¹¹⁷⁰ in feed¹¹⁶⁴.entries¹⁰⁶⁴) {
            ¹¹⁷²Set<Topic¹⁰⁵²> topics¹¹⁷⁴;
            ¹¹⁷⁶classify¹¹²⁴(entry¹¹⁷⁰, topics¹¹⁷⁴);
            ¹¹⁷⁸foreach(Topic¹⁰⁵² topic¹¹⁸⁰ in topics¹¹⁷⁴) {
                ¹¹⁸²Accumulator¹⁰⁴⁸ accumulator¹¹⁸⁴ = back¹¹⁶⁰.require_accumulator¹⁰⁴⁶(topic¹¹⁸⁰);
                ¹¹⁸⁶accumulator¹¹⁸⁴.items¹⁰⁹⁰.put(entry¹¹⁷⁰);
                ¹¹⁸⁸++accumulator¹¹⁸⁴.cardinality¹⁰⁹²;
            }
        }
    }
}
```

Fig. 16

```
void notice¹¹⁹⁰(Bookmark¹⁰⁸⁴ bookmark¹¹⁹²)
{
    ¹¹⁹⁴Corpus¹⁰⁴⁴ fore¹¹⁹⁶ = bookmark¹¹⁹².user¹⁰⁸⁶.foreground¹⁰⁹⁶;
    ¹¹⁹⁸Set<Topic¹⁰⁵²> topics¹²⁰⁰;
    ¹²⁰²classify¹¹²⁴(bookmark¹¹⁹², topics¹²⁰⁰);
    ¹²⁰⁴foreach(Topic¹⁰⁵² topic¹²⁰⁶ in topics¹²⁰⁰) {
        ¹²⁰⁸Accumulator¹⁰⁴⁸ accumulator¹²¹⁰ = fore¹¹⁹⁶.require_accumulator¹⁰⁴⁶(topic¹²⁰⁶);
        ¹²¹²accumulator¹²¹⁰.items¹⁰⁹⁰.put(bookmark¹¹⁹²);
        ¹²¹⁴++accumulator¹²¹⁰.cardinality¹⁰⁹²;
    }
}
```

Fig. 17

```
void weigh¹²¹⁶(Host¹¹¹⁴ host¹²¹⁸,
    User¹⁰⁸⁸ user¹²²⁰,
    Sequence<Entry¹⁰⁶⁶> ranking¹²²²)
{
    ¹²²⁴Corpus¹⁰⁴⁴ fore¹²²⁶ = user¹²²⁰.foreground¹⁰⁹⁶;
    ¹²²⁸Corpus¹⁰⁴⁴ back¹²³⁰ = host¹²¹⁸.background¹¹¹⁶;
    ¹²³²foreach(Feed¹⁰⁶² feed¹²³⁴ in user¹²²⁰.subscriptions¹⁰⁹⁸) {
        ¹²³⁶foreach(Entry¹⁰⁶⁶ entry¹²³⁸ in feed¹²³⁴.entries¹⁰⁶⁴) {
            ¹²⁴⁰entry¹²³⁸.weight¹⁰⁸⁰ = 0;
            ¹²⁴²foreach(Topic¹⁰⁵² topic¹²⁴⁴ in entry¹²³⁸.description¹⁰⁷².classification¹¹⁰⁰) {
                ¹²⁴⁶size_t fore_count¹²⁴⁸ = fore¹²²⁶.accumulator¹⁰⁵⁴(topic¹²⁴⁴).cardinality¹⁰⁹²;
                ¹²⁵⁰size_t fore_scale¹²⁵² = fore¹²²⁶.cardinality¹⁰⁵⁶;
                ¹²⁵⁴double fore_weight¹²⁵⁶ = (1 + fore_count¹²⁴⁸) / (1 + fore_scale¹²⁵²);
                ¹²⁵⁸size_t back_count¹²⁶⁰ = back¹²³⁰.accumulator¹⁰⁵⁴(topic¹²⁴⁴).cardinality¹⁰⁹²;
                ¹²⁶²size_t back_scale¹²⁶⁴ = back¹²³⁰.cardinality¹⁰⁵⁶;
                ¹²⁶⁶double back_weight¹²⁶⁸ = (1 + back_count¹²⁶⁰) / (1 + back_scale¹²⁶⁴);
                ¹²⁷⁰entry¹²³⁸.weight¹⁰⁸⁰ += log(fore_weight¹²⁵⁶ / back_weight¹²⁶⁸);
            }
            ¹²⁷²ranking¹²²².push(entry¹²³⁸);
        }
    }
    ¹²⁷⁴ranking¹²²².sort() // by descending weight¹⁰⁸⁰;
}
```

Fig. 18

```
void display¹²⁷⁶(Host¹¹¹⁴ host¹²⁷⁸,
    User¹⁰⁸⁸ user¹²⁸⁰,
    Sequence<Entry¹⁰⁶⁶> ranking¹²⁸²)
{
    ¹²⁸⁴foreach(Entry¹⁰⁶⁶ entry¹²⁸⁶ in ranking¹²⁸²) {
        ¹²⁸⁸print(host¹²⁷⁸.user_feed_link¹¹³²(user¹²⁸⁰, entry¹²⁸⁶.feed¹⁰⁸²));
        ¹²⁹⁰print(host¹²⁷⁸.entry_title_link¹¹³⁸(entry¹²⁸⁶));
        ¹²⁹²foreach(Span¹¹⁰⁴ span¹²⁹⁴ in entry¹²⁸⁶.description¹⁰⁷².segmentation¹¹⁰²) {
            ¹²⁹⁶if (span¹²⁹⁴.topic¹¹¹⁰) {
                ¹²⁹⁸print(host¹²⁷⁸.span_topic_link¹¹⁴²(span¹²⁹⁴));
            }
            ¹³⁰⁰else {
                ¹³⁰²print(span¹²⁹⁴.text¹¹⁰⁸);
            }
        }
        ¹³⁰⁴Sequence<Accumulator¹⁰⁴⁸> accumulators¹³⁰⁶;
        ¹³⁰⁸foreach(Topic¹⁰⁵² topic¹³¹⁰ in entry¹²⁸⁶.description¹⁰⁷².classification¹¹⁰⁰) {
            ¹³¹²accumulators¹³⁰⁶.put(user¹²⁸⁰.foreground¹⁰⁹⁶.accumulator¹⁰⁵⁴(topic¹³¹⁰));
        }
        ¹³¹⁴accumulators¹³⁰⁶.sort() // by descending cardinality¹⁰⁹²;
        ¹³¹⁶foreach(Accumulator¹⁰⁴⁸ accumulator¹³¹⁸ in accumulators¹³⁰⁶) {
            ¹³²⁰print(host¹²⁷⁸.user_topic_link¹¹⁴⁶(user¹²⁸⁰, accumulator¹³¹⁸.topic¹⁰⁹⁴));
        }
    }
}
```

BOOKMARK-GUIDED, TAXONOMY-BASED, USER-SPECIFIC DISPLAY OF SYNDICATION FEED ENTRIES USING NATURAL LANGUAGE DESCRIPTIONS IN FOREGROUND AND BACKGROUND CORPORA

CROSS-REFERENCE TO RELATED APPLICATION

This application claims the benefit of PPA Ser. No. 61/123,645, filed Jun. 20, 2008 by the present inventor, which is incorporated by reference.

BACKGROUND OF THE INVENTION

The invention pertains to the classification and processing of syndication feed entries, specifically to the use of web bookmarks to provide a user-specific display of syndication feed entries.

SUMMARY

A bookmark-driven, taxonomy-based, user-specific display of syndication feed entries is provided, making use of natural-language descriptions in foreground and background corpora. In a notice step, a user-specific bookmark is received. The bookmark provides a natural-language description characterizing a bookmark resource. In a bookmark classification step, the natural-language description associated with the received bookmark is classified to determine one or more topics, which are maintained in a taxonomy. The taxonomy is augmented to accept new topics as necessary. The bookmark topics are each associated with accumulators in a user-specific foreground corpus. Accumulators are provided as necessary to accommodate new topics. Each bookmark is accumulated to the accumulators corresponding to each of the bookmark topics. Similarly, in a publish step, feed syndication entries are received and classified according to associated natural-language descriptions. Entry topics are associated with accumulators in a shared background corpus. In a weigh step, a user-specific weight is determined for each entry by aggregating the accumulators corresponding to the entry topics for the foreground and background corpora. In a display step, entries are displayed for a specific user in order of declining user-specific weight.

BRIEF DESCRIPTION OF THE DRAWINGS

FIG. 3 depicts a definition for an exemplary corpus class which collects items and topic accumulators.

FIG. 4 depicts a definition for an exemplary feed class which represents a syndication feed providing entries.

FIG. 5 depicts a definition for an exemplary topic class which indexes accumulators in corpora according to shared subject matter.

FIG. 6 depicts a definition for an exemplary item class which associates a description to a described resource.

FIG. 7 depicts a definition for an exemplary entry class which associates a description to a resource as provided by a syndication feed.

FIG. 8 depicts a definition for an exemplary bookmark class which associates a description to a resource by or on behalf of a user.

FIG. 9 depicts a definition for an exemplary accumulator class which accumulates items corresponding to a topic.

FIG. 10 depicts a definition for an exemplary user class which represents a user for whom user-specific entry weights will be computed and on whose behalf bookmarks will be accepted.

FIG. 11 depicts a definition for an exemplary description class which provides a natural-language textual description of a resource and a corresponding classification derived from the textual description.

FIG. 12 depicts a definition for an exemplary span class which represents a textual segment of a description to which at most one topic may be associated.

FIG. 13 depicts a definition for an exemplary resource class which specifies a resource corresponding to an entry or a bookmark.

FIG. 14 depicts a definition for an exemplary host class which provides data structures and algorithms suitable for use in provision of a bookmark-driven, taxonomy-based, user-specific display of syndication feed entries making use of natural-language descriptions in foreground and background corpora.

FIG. 15 depicts a definition for an exemplary publish task which accumulates feed entries to the background corpus.

FIG. 16 depicts a definition for an exemplary notice task which receives a bookmark from a user.

FIG. 17 depicts a definition for an exemplary weigh task which determines user-specific weights for feed entries.

FIG. 18 depicts a definition for an exemplary user-specific display task which provides a user-specific display of feed entries according to the supplied ordering.

DETAILED DESCRIPTION

Figure 1:
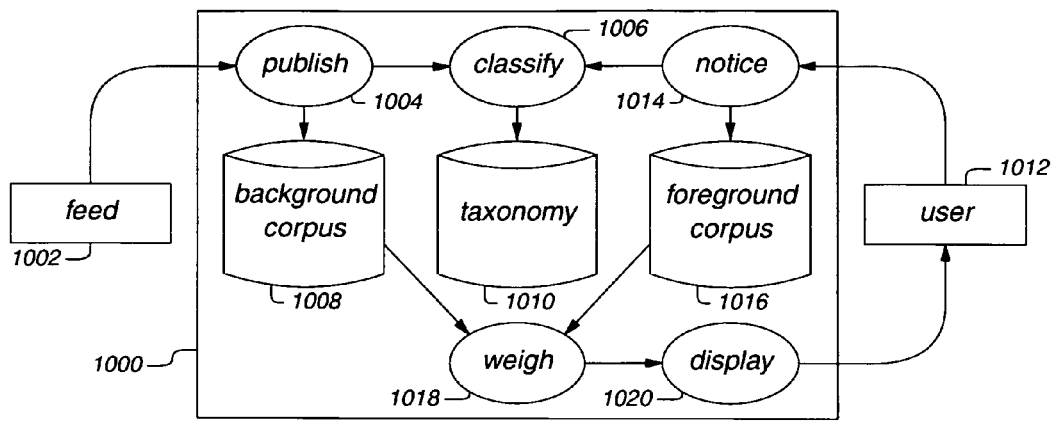
FIG. 1 depicts an overview of an exemplary system for providing a bookmark-driven, taxonomy-based, user-specific display of syndication feed entries, making use of natural language descriptions in foreground and background corpora.

Syndication feeds have gained popularity among sophisticated internet users. Feed aggregators combine syndication feeds from diverse providers into a single pool of entries which may be more efficiently managed than by individual visits to the sites of feed providers. However, the enormous volume of content leaves users with the daunting task of sifting through hundreds or even thousands of entries to identify potentially interesting web resources; busy users must allocate ever-greater amounts of time to keep up with ever-expanding internet offerings.

The challenge of efficiently allocating precious user time to harnessing the deluge of online information is addressed by a bookmark-driven, taxonomy-based, user-specific display of syndication feed entries making use of natural-language descriptions in foreground and background corpora. The investment of a user in the collection of bookmarks is leveraged to prioritize incoming feed entries.

A user may be a human, an organization, or a computational agent. A user provides bookmarks, each of which incorporates a reference to an internet resource and a natural-language description characterizing the significance of the resource from the user's point of view. Bookmarks are also known as favorites. The act or event of a user contributing a bookmark and the associated processing is denoted noticing, by analogy to the user's notice of the bookmarked resource.

Syndication feeds are web resources that provide the illusion of a subscription/publication model for web resources. In reality, feeds must be polled like other web resources, but this reality is commonly hidden from users by intervening programs, typically feed readers. Feeds are provided using a bewildering plentitude of protocols, including numerous versions of RSS and Atom. Fortunately, the superb Universal Feed Parser by Mark Pilgrim provides a uniform interface to the protocol universe. The act or event of polling a feed resource, parsing entries, and performing subsequent processing is denoted as publishing, in keeping with the illusion of subscription and publication that feeds embrace.

An entry is a basic unit of a feed, corresponding to the syndication of a web resource, with relevant associated metadata pertaining to the syndicated resource. A title, a summary, and other information about the resource is typically provided in the entry. The metadata of an entry may be readily processed to develop a natural-language description of the corresponding web resource.

Natural-language descriptions are easy and natural for users to produce. Moreover, natural language descriptions may be processed in a classification task to determine topics intrinsically related by generalization and specialization. A collection of topics interrelated by generalization and specialization is denoted a taxonomy. A method of processing natural-language descriptions to determine topics has been disclosed by the present inventor in a pending U.S. patent application, "Web Bookmark Manager," application Ser. No. 11/503,047, filed Aug. 11, 2006, and published Feb. 22, 2007, Pub. No. US-2007-0043745-A1, herein incorporated by reference. Bookmarks and entries may be generalized to items, reflecting the commonality of reference to internet resources and the availability of natural-language description. With classification providing topics, collections of items may be organized by topic, items may be accumulated under specific topics, and relative frequencies of topic occurrences may be determined. A collection of items organized by topics is denoted a corpus. The present invention distinguishes a shared background corpus formed by processing feed entries from a collection of user-specific foreground corpora, each of which is formed by processing the bookmarks of a particular user.

In assessing the significance of a particular entry for a particular user, the classification of the entry's description provides a set of topics. A topic corresponding to a relatively large accumulation of bookmarks in the particular user's foreground corpus is considered to be a relatively significant topic. For two topics with comparable accumulations of bookmarks in the foreground corpus, the topic which has less accumulation in the shared background corpus is considered more significant, since a lower frequency in the background suggests a greater element of "surprise" hence value in the large accumulation in the foreground corpus. This informal notion of significance may be formalized to support computation of a user-specific weight for the particular entry for the particular user by aggregation over entry topics relative to the user-specific corpus of bookmarks and the shared corpus of feed entries. The user-specific weight then provides a basis for user-specific ordering of feed entries for presentation to the particular user in a display operation.

In the subsequent description of a bookmark-driven, taxonomy-based, user-specific display of syndication feed entries making use of natural-language descriptions in foreground and background corpora, data structures and algorithms are presented using an informal pseudocode which is modeled on C++ but is readily applicable to implementation in any modern programming language. For simplicity and economy of presentation, class members are exposed as public elements in class definitions (via the use of struct definitions). In an alternate embodiment, such members could be private and access to the members would be mediated by member functions. In an actual implementation, instances would be represented by pointers, references, or values, according to convention and the tastes of the implementor; the presentation here does not distinguish these implementation details. Moreover, for clarity and simplicity, the presentation here deliberately avoids trapping and handling of errors in processing. A practitioner of ordinary skill in the art would be easily capable of providing error-handling where appropriate.

System and Data Model

Refer to FIG. 1. A system 1000 provides a bookmark-driven, taxonomy-based, user-specific display of syndication feed entries, making use of natural language descriptions in foreground and background corpora. An actual-feed 1002 provides entries, which are processed in a publish-task 1004. Each entry includes a reference to an internet resource. The published entries each provide a natural-language description which is subsequently processed in a classify-task 1006, in which taxonomy topics are determined to permit classification of feed entries. Entries are accumulated in a background-corpus 1008, which is shared by all users. The shared background-corpus 1008 provides an accumulation of entries corresponding to the topics determined by classification of the entries. Topics are collected in a taxonomy 1010, which is augmented as necessary in the classify-task 1006 to accommodate new topics.

An actual-user 1012 contributes bookmarks in a notice-task 1014. Each bookmark includes a reference to an internet resource coupled with a user-specific natural-language description of the resource. The contributed description is also processed by the classify-task 1006, yielding topics to permit classification of bookmarks. Bookmarks are accumulated in a user-specific foreground-corpus 1016. The user-specific foreground-corpus 1016 provides an accumulation of bookmarks corresponding to the topics determined by classification of the bookmarks.

Any topic may thus correspond to an accumulation of entries in the shared background-corpus 1008, and to an accumulation of bookmarks in any user-specific foreground-corpus 1016. A topic corresponding to a relatively large accumulation of bookmarks in a user-specific corpus is considered to be a relatively significant topic for the corresponding user. Moreover, for two topics with comparable accumulations of bookmarks in a user-specific corpus, the topic which has less accumulation in the shared background corpus is considered more significant, since a lower frequency in the background suggests a greater element of "surprise" hence value in the large accumulation in the foreground corpus. A weigh-task 1018 formalizes this informal notion of significance to compute a user-specific weight for any entry relative to the user-specific corpus of bookmarks and the shared corpus of feed entries. The user-specific weight provides a basis for ordering feed entries in a display-task 1020, in which entries which are determined to have a greater weight are presented ahead of entries with a lower weight in a user-specific display.

Figure 2:
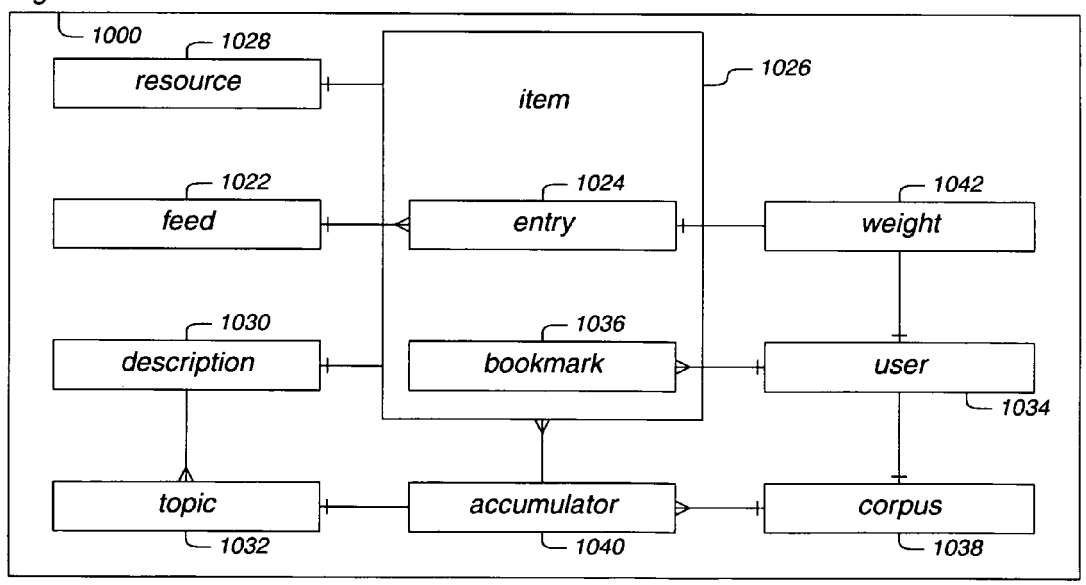
FIG. 2 depicts an exemplary data model suitable for providing a bookmark-driven, taxonomy-based, user-specific display of syndication feed entries, making use of natural language descriptions in foreground and background corpora.

Refer to FIG. 2. The system 1000 defines several representational categories for use in provision of a bookmark-driven, taxonomy-based, user-specific display of syndication feed entries, making use of natural language descriptions in foreground and background corpora.

Each feed-entity 1022 represents a syndication feed. Each feed-entity 1022 thus corresponds to the actual-feed 1002. Each feed-entity 1022 may be associated with one or more entry-entity 1024.

Each item-entity 1026 represents a generalized corpus element, including bookmarks and entries. Each item-entity 1026 must be associated with exactly one resource-entity 1028. Each resource-entity 1028 represents a particular internet resource. Each item-entity 1026 must be associated with exactly one description-entity 1030. Each description-entity 1030 represents a natural-language description corresponding to an item-entity 1026. Each description-entity 1030 may be associated with one or more topic-entity 1032. The association of topics with descriptions is mediated by the classify-task 1006. Each topic-entity 1032 represents a classification which may be used to group related items.

Each entry-entity 1024 represents a particular entry in a particular feed. The entry-entity 1024 specializes the item-entity 1026. Each entry-entity 1024 must be associated with exactly one feed-entity 1022. The associations of the entry-entity 1024 with the feed-entity 1022, the resource-entity 1028 (via the item-entity 1026), and the description-entity 1030 (via the item-entity 1026) are mediated by the publish-task 1004.

Each user-entity 1034 represents a person, organization, or computational agent for whom bookmarks are accumulated and for whom entries are displayed. Each user-entity 1034 thus corresponds to the actual-user 1012. Each user-entity 1034 may be associated with one or more bookmark-entity 1036. Each user-entity 1034 must be associated with exactly one corpus-entity 1038, corresponding to the foreground-corpus 1016.

Each bookmark-entity 1036 represents a user-specific description of an internet resource. The bookmark-entity 1036 specializes the item-entity 1026. Each bookmark-entity 1036 must be associated with exactly one user-entity 1034. The association of the bookmark-entity 1036 with the resource-entity 1028 (via the item-entity 1026), the user-entity 1034, and the description-entity 1030 (via the item-entity 1026) is mediated by the notice-task 1014.

Each corpus-entity 1038 represents an accumulation of items organized by topics, via accumulators. Each corpus-entity 1038 may be associated with one or more accumulator-entity 1040. Each user-entity 1034 is associated with a user-specific foreground corpus; the feed collection is associated with a shared background corpus.

Each accumulator-entity 1040 accumulates items corresponding to a particular topic in a particular corpus. Each accumulator-entity 1040 may be associated with one or more item-entity 1026. Each accumulator-entity 1040 must be associated with exactly one topic-entity 1032.

Each accumulator-entity 1040 must be associated with exactly one corpus-entity 1038. Each weight-entity 1042 predicts the significance of a particular entry for a particular user. Each weight-entity 1042 must be associated with exactly one user-entity 1034. Each weight-entity 1042 must be associated with exactly one entry-entity 1024. The determination of each weight-entity 1042 is mediated by the weigh-task 1018. The user-specific presentation of a collection of entries is mediated by the display-task 1020, which uses the computed weight-entity 1042 to determine the order in which entries are displayed.

Object-Oriented Implementation

Refer to FIG. 3. The corpus-class 1044 collects items and topic accumulators. The corpus-class 1044 corresponds to the corpus-entity 1038. The require-accumulator-function 1046 obtains an accumulator corresponding to the supplied topic. The require-accumulator-function 1046 will augment the corpus with a new accumulator as necessary. The require-accumulator-function 1046 returns an instance of the accumulator-class 1048. The require-accumulator-function 1046 accepts an argument topic-instance 1050, providing an instance of the topic-class 1052. The topic-instance 1050 specifies the topic for which accumulator is required. The accumulator-map 1054 provides accumulators of items indexed by topic. The accumulator-map 1054 ranges over instances of the accumulator-class 1048. The cardinality-value 1056 specifies cardinality of collected items ranging over all topics. The cardinality-value 1056 ranges over scalar cardinal values. The items-set 1058 collects corpus items. The items-set 1058 ranges over instances of the item-class 1060.

Refer to FIG. 4. The feed-class 1062 represents a syndication feed providing entries. The feed-class 1062 corresponds to the feed-entity 1022. The entries-set 1064 represents entries provided by the feed. The entries-set 1064 ranges over instances of the entry-class 1066.

Refer to FIG. 5. The topic-class 1052 indexes accumulators in corpora according to shared subject matter. The topic-class 1052 corresponds to the topic-entity 1032. The genera-set 1068 specifies topics of greater generality. The genera-set 1068 ranges over instances of the topic-class 1052. The species-set 1070 specifies topics of greater specificity. The species-set 1070 ranges over instances of the topic-class 1052.

Refer to FIG. 6. The item-class 1060 associates a description to a described resource. The item-class 1060 corresponds to the item-entity 1026. The item-class 1060 generalizes entry and bookmark. The description-instance 1072 specifies the associated description. The description-instance 1072 ranges over instances of the description-class 1074. The resource-instance 1076 specifies the associated resource. The resource-instance 1076 ranges over instances of the resource-class 1078.

Refer to FIG. 7. The entry-class 1066 associates a description to a resource as provided by a syndication feed. The entry-class 1066 corresponds to the entry-entity 1024. The entry-class 1066 specializes the item-class 1060. The weight-value 1080 represents the computed weight of the entry. The weight-value 1080 ranges over scalar floating point values. The feed-instance 1082 specifies the feed which provided the entry. The feed-instance 1082 ranges over instances of the feed-class 1062.

Refer to FIG. 8. The bookmark-class 1084 associates a description to a resource by or on behalf of a user. The bookmark-class 1084 corresponds to the bookmark-entity 1036. The bookmark-class 1084 specializes the item-class 1060. The user-instance 1086 specifies the user on whose behalf the bookmark is provided. The user-instance 1086 ranges over instances of the user-class 1088.

Refer to FIG. 9. The accumulator-class 1048 accumulates items corresponding to a topic. The accumulator-class 1048 corresponds to the accumulator-entity 1040. The items-set 1090 collects accumulated items. The items-set 1090 ranges over instances of the item-class 1060. The cardinality-value 1092 specifies cardinality of collected items. The cardinality-value 1092 ranges over scalar cardinal values. The topic-instance 1094 specifies the corresponding topic by which the accumulator is indexed. The topic-instance 1094 ranges over instances of the topic-class 1052.

Refer to FIG. 10. The user-class 1088 represents a user for whom user-specific entry weights will be computed and on whose behalf bookmarks will be accepted. The user-class 1088 corresponds to the user-entity 1034. The foreground-instance 1096 accumulates bookmarks by topic. The foreground-instance 1096 ranges over instances of the corpus-class 1044. The subscriptions-set 1098 specifies feeds providing entries which will be weighed and displayed on behalf of the user. The subscriptions-set 1098 ranges over instances of the feed-class 1062.

Refer to FIG. 11. The description-class 1074 provides a natural-language textual description of a resource and a corresponding classification derived from the textual description. The description-class 1074 corresponds to the description-entity 1030. The classification-set 1100 specifies the topics derived by classification. The classification-set 1100 ranges over instances of the topic-class 1052. The segmentation-sequence 1102 specifies a span-based segmentation for use in display of the description. The segmentation-sequence 1102 ranges over instances of the span-class 1104. The text-value 1106 specifies the natural-language textual description which is applicable to an item. The text-value 1106 ranges over scalar text values.

Refer to FIG. 12. The span-class 1104 represents a textual segment of a description to which at most one topic may be associated. The span-class 1104 is convenient for display where at most one hyperlink may be associated with a particular span of text. The text-value 1108 specifies the textual content of the span. The text-value 1108 ranges over scalar text values. The topic-instance 1110 specifies an associated topic corresponding to the textual segment. The topic-instance 1110 ranges over instances of the topic-class 1052. The topic-instance 1110 is optional.

Refer to FIG. 13. The resource-class 1078 specifies a resource corresponding to an entry or a bookmark. The resource-class 1078 corresponds to the resource-entity 1028. The uri-value 1112 specifies a web-oriented address at which the resource may be found. The uri-value 1112 ranges over scalar text values.

Refer to FIG. 14. The host-class 1114 provides data structures and algorithms suitable for use in provision of a bookmark-driven, taxonomy-based, user-specific display of syndication feed entries making use of natural-language descriptions in foreground and background corpora. The host-class 1114 corresponds to the system 1000. The background-instance 1116 accumulates entries by topic. The background-instance 1116 ranges over instances of the corpus-class 1044. The feeds-set 1118 represents feeds providing entries. The feeds-set 1118 ranges over instances of the feed-class 1062. The poll-function 1120 requests up-to-date entries for a feed. The poll-function 1120 populates the entries of the supplied feed. The poll-function 1120 may incorporate request, parsing, detection of duplicate entries, etc. The poll-function 1120 assembles descriptive text for each entry. The poll-function 1120 returns nothing. The poll-function 1120 accepts an argument poll-feed-instance 1122, providing an instance of the feed-class 1062. The classify-function 1124 determines topics corresponding to the description associated with the supplied subject item. The classify-function 1124 corresponds to the classify-task 1006. The classify-function 1124 augments the taxonomy-set 1126 with additional topics as necessary. The classify-function 1124 may use the method disclosed in a pending US patent application "Web Bookmark Manager," application Ser. No. 11/503,047, filed Aug. 11, 2006, incorporated herein by reference. The classify-function 1124 returns nothing. The classify-function 1124 accepts an argument subject-instance 1128, providing an instance of the item-class 1060. The classify-function 1124 accepts an argument topics-set 1130, providing a set of topic-class 1052 instances. The user-feed-link-function 1132 provides a hypertext link to a user-specific display of entries from a particular feed. The user-feed-link-function 1132 returns a text value. The user-feed-link-function 1132 accepts an argument link-user-instance 1134, providing an instance of the user-class 1088. The user-feed-link-function 1132 accepts an argument link-feed-instance 1136, providing an instance of the feed-class 1062. The entry-title-link-function 1138 provides a hypertext link to the entry resource using the title of the entry to supply the link content. The entry-title-link-function 1138 returns a text value. The entry-title-link-function 1138 accepts an argument link-entry-instance 1140, providing an instance of the user-class 1088. The span-topic-link-function 1142 provides a hypertext link to a presentation of entries accumulated in the background corpus according to the specified topic. The span-topic-link-function 1142 uses the span text to supply the link content. The span-topic-link-function 1142 returns a text value. The span-topic-link-function 1142 accepts an argument span-topic-instance 1144, providing an instance of the topic-class 1052. The user-topic-link-function 1146 provides a hypertext link to a presentation of bookmarks accumulated in the foreground corpus according to the specified topic. The user-topic-link-function 1146 uses the topic text to supply the link content. The user-topic-link-function 1146 returns a text value. The user-topic-link-function 1146 accepts an argument link-user-instance 1148, providing an instance of the user-class 1088. The user-topic-link-function 1146 accepts an argument link-topic-instance 1150, providing an instance of the topic-class 1052. The users-set 1152 represents users providing bookmarks and consuming entries. The users-set 1152 ranges over instances of the user-class 1088. The taxonomy-set 1126 represents topics for organizing and weighing entries and bookmarks. The taxonomy-set 1126 ranges over instances of the topic-class 1052.

Task Operations

Refer to FIG. 15. The publish-task 1154 accumulates feed entries to the background corpus. The publish-task 1154 corresponds to the publish-task 1004. The host 1156 contains the feeds which are to be published. The host 1156 is specified according to the host-class 1114. The declaration-step 1158, subordinate to the publish-task 1154, specifies the back-instance 1160. The back-instance 1160 ranges over instances of the corpus-class 1044. The back-instance 1160 specifies the background corpus to which entry topics will be accumulated. The back-instance 1160 is initialized to the background-instance 1116 of the host 1156. The foreach-step 1162, subordinate to the publish-task 1154, uses an iterator feed-instance 1164 ranging over instances of the class feed-class 1062 and operating over a domain specified by the feeds-set 1118 of the host 1156. The invocation-step 1166, subordinate to the foreach-step 1162, invokes the poll-function 1120 with the feed-instance 1164. The invocation-step 1166 polls the feed to collect up-to-date entries. The foreach-step 1168, subordinate to the foreach-step 1162, uses an iterator entry-instance 1170 ranging over instances of the class entry-class 1066 and operating over a domain specified by the entries-set 1064 of the feed-instance 1164. The declaration-step 1172, subordinate to the foreach-step 1168, specifies the topics-set 1174, having set arity. The topics-set 1174 ranges over instances of the topic-class 1052. The topics-set 1174 collects topics to which the supplied entry has been associated by the classifier. The invocation-step 1176, subordinate to the foreach-step 1168, invokes the classify-function 1124 with the entry-instance 1170 and the topics-set 1174. The invocation-step 1176 assigns topics according to the item text provided by the supplied entry. The foreach-step 1178, subordinate to the foreach-step 1168, uses an iterator topic-instance 1180 ranging over instances of the class topic-class 1052 and operating over a domain specified by the topics-set 1174. The declaration-step 1182, subordinate to the foreach-step 1178, specifies the accumulator-instance 1184. The accumulator-instance 1184 ranges over instances of the accumulator-class 1048. The accumulator-instance 1184 specifies the accumulator to which the entry is directed. The accumulator-instance 1184 is initialized to the require-accumulator-function 1046 (evaluated using the topic-instance 1180) of the back-instance 1160. The put-step 1186, subordinate to the foreach-step 1178, accumulates the entry-instance 1170 to the items-set 1090 of the accumulator-instance 1184. The increment-step 1188, subordinate to the foreach-step 1178, increments the cardinality-value 1092 of the accumulator-instance 1184.

Refer to FIG. 16. The notice-task 1190 receives a bookmark from a user. The notice-task 1190 updates the user's foreground corpus. The notice-task 1190 corresponds to the notice-task 1014. The bookmark-instance 1192 specifies the bookmark which is to be accumulated to the user's corpus. The bookmark-instance 1192 ranges over instances of the bookmark-class 1084. The declaration-step 1194, subordinate to the notice-task 1190, specifies the fore-instance 1196. The fore-instance 1196 ranges over instances of the corpus-class 1044. The fore-instance 1196 specifies the particular foreground corpus to which the bookmark will be accumulated. The fore-instance 1196 is initialized to the foreground-instance 1096 of the user-instance 1086 of the bookmark-instance 1192. The declaration-step 1198, subordinate to the notice-task 1190, specifies the topics-set 1200, having set arity. The topics-set 1200 ranges over instances of the topic-class 1052. The topics-set 1200 collects topics to which the supplied bookmark has been associated by the classifier. The invocation-step 1202, subordinate to the notice-task 1190, invokes the classify-function 1124 with the bookmark-instance 1192 and the topics-set 1200. The invocation-step 1202 assigns topics according to the item text provided by the supplied bookmark. The foreach-step 1204, subordinate to the notice-task 1190, uses an iterator topic-instance 1206 ranging over instances of the class topic-class 1052 and operating over a domain specified by the topics-set 1200. The declaration-step 1208, subordinate to the foreach-step 1204, specifies the accumulator-instance 1210. The accumulator-instance 1210 ranges over instances of the accumulator-class 1048. The accumulator-instance 1210 specifies the accumulator to which the bookmark is directed. The accumulator-instance 1210 is initialized to the require-accumulator-function 1046 (evaluated using the topic-instance 1206) of the fore-instance 1196. The put-step 1212, subordinate to the foreach-step 1204, accumulates the bookmark-instance 1192 to the items-set 1090 of the accumulator-instance 1210. The increment-step 1214, subordinate to the foreach-step 1204, increments the cardinality-value 1092 of the accumulator-instance 1210.

Refer to FIG. 17. The weigh-task 1216 determines user-specific weights for feed entries. The weigh-task 1216 also orders entries according to declining user-specific weight. The weigh-task 1216 corresponds to the weigh-task 1018. The host 1218 provides the background corpus. The host 1218 is specified according to the host-class 1114. The user-instance 1220 specifies the user for which the ranking will be determined. The user-instance 1220 ranges over instances of the user-class 1088. The ranking-sequence 1222 accepts ordered entries according to computed weight. The ranking-sequence 1222 ranges over instances of the entry-class 1066. The declaration-step 1224, subordinate to the weigh-task 1216, specifies the fore-instance 1226. The fore-instance 1226 ranges over instances of the corpus-class 1044. The fore-instance 1226 specifies the user's particular corpus towards which entry rankings will be determined. The fore-instance 1226 is initialized to the foreground-instance 1096 of the user-instance 1220. The declaration-step 1228, subordinate to the weigh-task 1216, specifies the back-instance 1230. The back-instance 1230 ranges over instances of the corpus-class 1044. The back-instance 1230 specifies the background corpus against which entry rankings will be determined. The back-instance 1230 is initialized to the background-instance 1116 of the host 1218. The foreach-step 1232, subordinate to the weigh-task 1216, uses an iterator feed-instance 1234 ranging over instances of the class feed-class 1062 and operating over a domain specified by the subscriptions-set 1098 of the user-instance 1220. The foreach-step 1236, subordinate to the foreach-step 1232, uses an iterator entry-instance 1238 ranging over instances of the class entry-class 1066 and operating over a domain specified by the entries-set 1064 of the feed-instance 1234. The assignment-step 1240, subordinate to the foreach-step 1236, assigns zero to the weight-value 1080 of the entry-instance 1238. The foreach-step 1242, subordinate to the foreach-step 1236, uses an iterator topic-instance 1244 ranging over instances of the class topic-class 1052 and operating over a domain specified by the classification-set 1100 of the description-instance 1072 of the entry-instance 1238. The declaration-step 1246, subordinate to the foreach-step 1242, specifies the fore-count-value 1248. The fore-count-value 1248 ranges over scalar cardinal values. The fore-count-value 1248 provides the accumulated count of items corresponding to the topic in the foreground corpus corresponding to the user. The fore-count-value 1248 is initialized to the cardinality-value 1092 of the accumulator-map 1054 (evaluated using the topic-instance 1244) of the fore-instance 1226. The declaration-step 1250, subordinate to the foreach-step 1242, specifies the fore-scale-value 1252. The fore-scale-value 1252 ranges over scalar cardinal values. The fore-scale-value 1252 provides a scaling weight for the foreground count corresponding to the accumulated count of items for all topics in the foreground corpus corresponding to the user. The fore-scale-value 1252 is initialized to the cardinality-value 1056 of the fore-instance 1226. The declaration-step 1254, subordinate to the foreach-step 1242, specifies the fore-weight-value 1256. The fore-weight-value 1256 ranges over scalar floating point values. The fore-weight-value 1256 provides a scaled foreground weight for the topic. The fore-weight-value 1256 has unit offsets in the numerator and denominator to accommodate empty accumulations. The fore-weight-value 1256 is initialized to the ratio of the sum of one added to the fore-count-value 1248 divided by the sum of one added to the fore-scale-value 1252. The declaration-step 1258, subordinate to the foreach-step 1242, specifies the back-count-value 1260. The back-count-value 1260 ranges over scalar cardinal values. The back-count-value 1260 provides the accumulated count of items corresponding to the topic in the background corpus. The back-count-value 1260 is initialized to the cardinality-value 1092 of the accumulator-map 1054 (evaluated using the topic-instance 1244) of the back-instance 1230. The declaration-step 1262, subordinate to the foreach-step 1242, specifies the back-scale-value 1264. The back-scale-value 1264 ranges over scalar cardinal values. The back-scale-value 1264 provides a scaling weight for the background count of accumulated items for all topics in the background corpus. The back-scale-value 1264 is initialized to the cardinality-value 1056 of the back-instance 1230. The declaration-step 1266, subordinate to the foreach-step 1242, specifies the back-weight-value 1268. The back-weight-value 1268 ranges over scalar floating point values. The back-weight-value 1268 provides a scaled background weight for the topic. The backweight-value 1268 has unit offsets in the numerator and denominator to accommodate empty accumulations. The back-weight-value 1268 is initialized to the ratio of the sum of one added to the back-count-value 1260 divided by the sum of one added to the back-scale-value 1264. The accumulation-step 1270, subordinate to the foreach-step 1242, adds the logarithm of the ratio of the fore-weight-value 1256 divided by the back-weight-value 1268 to the weight-value 1080 of the entry-instance 1238. The push-step 1272, subordinate to the foreach-step 1236, pushes the entry-instance 1238 onto the ranking-sequence 1222. The sort-step 1274, subordinate to the weigh-task 1216, sorts the ranking-sequence 1222 by descending order of the weight-value 1080.

Refer to FIG. 18. The user-specific display-task 1276 provides a user-specific display of feed entries according to the supplied ordering. The user-specific display-task 1276 corresponds to the display-task 1020. The host 1278 provides link-related formatting. The host 1278 is specified according to the host-class 1114. The user-instance 1280 specifies the user for which the display will be determined. The user-instance 1280 ranges over instances of the user-class 1088. The ranking-sequence 1282 provides ordered entries according to computed weight. The ranking-sequence 1282 ranges over instances of the entry-class 1066. The foreach-step 1284, subordinate to the user-specific display-task 1276, uses an iterator entry-instance 1286 ranging over instances of the class entry-class 1066 and operating over a domain specified by the ranking-sequence 1282. The print-step 1288, subordinate to the foreach-step 1284, prints the user-feed-link-function 1132 (evaluated using the user-instance 1280 and the feed-instance 1082 of the entry-instance 1286) of the host 1278. The print-step 1290, subordinate to the foreach-step 1284, prints the entry-title-link-function 1138 (evaluated using the entry-instance 1286) of the host 1278. The foreach-step 1292, subordinate to the foreach-step 1284, uses an iterator span-instance 1294 ranging over instances of the class span-class 1104 and operating over a domain specified by the segmentation-sequence 1102 of the description-instance 1072 of the entry-instance 1286. The if-step 1296, subordinate to the foreach-step 1292, tests the topic-instance 1110 of the span-instance 1294. The print-step 1298, subordinate to the if-step 1296, prints the span-topic-link-function 1142 (evaluated using the span-instance 1294) of the host 1278. Alternatively, the else-step 1300, subordinate to the foreach-step 1292, is evaluated. The print-step 1302, subordinate to the else-step 1300, prints the text-value 1108 of the span-instance 1294. The declaration-step 1304, subordinate to the foreach-step 1284, specifies the accumulators-sequence 1306, having sequence arity. The accumulators-sequence 1306 ranges over instances of the accumulator-class 1048. The accumulators-sequence 1306 orders accumulators according to descending cardinality. The foreach-step 1308, subordinate to the foreach-step 1284, uses an iterator topic-instance 1310 ranging over instances of the class topic-class 1052 and operating over a domain specified by the classification-set 1100 of the description-instance 1072 of the entry-instance 1286. The put-step 1312, subordinate to the foreach-step 1308, accumulates the accumulator-map 1054 (evaluated using the topic-instance 1310) of the foreground-instance 1096 of the user-instance 1280 to the accumulators-sequence 1306. The sort-step 1314, subordinate to the foreach-step 1284, sorts the accumulators-sequence 1306 by descending order of the cardinality-value 1092. The foreach-step 1316, subordinate to the foreach-step 1284, uses an iterator accumulator-instance 1318 ranging over instances of the class accumulator-class 1048 and operating over a domain specified by the accumulators-sequence 1306. The print-step 1320, subordinate to the foreach-step 1316, prints the user-topic-link-function 1146 (evaluated using the user-instance 1280 and the topic-instance 1094 of the accumulator-instance 1318) of the host 1278.

Alternative Embodiments

The exemplary embodiment which is disclosed above uses a shared background-corpus 1008 to provide a background for relative weighting versus a user-specific foreground-corpus 1016. In an alternative embodiment, the collection of entries aggregated over the subscriptions-set 1098 could provide a user-specific background corpus.

The exemplary embodiment which is disclosed above uses a weighting technique in which all topics to which the entry has been accumulated participate in the weight computation. An alternative embodiment could suppress or attenuate the contributions of generic topics where species topics have been accumulated. Another alternative embodiment of weighting could attenuate the contribution of low-cardinality topics, in accordance with techniques such as Good-Turing estimation, which have been found useful in linguistic computations where word and topic frequencies vary over a very wide range. Unattenuated use of low-frequency counts overestimates the probability of low frequency observations, and underestimates the probability of missing observations. The unit offsets in the disclosed weighting address these concerns in a naive fashion. More rigorous approaches including Good-Turing estimation could be used in alternative embodiments.

The exemplary embodiment which is disclosed above displays topics to which an entry has been classified in order of declining cardinality. In an alternative embodiment, topics could be displayed in alphabetic order, with cardinality differences depicted using visual indicators such as font, size, and color. The widely popular adoption of tag clouds on many current web sites exemplifies alternate representation of topic significance. In another alternative embodiment, topics could be ordered using their weight contribution as disclosed in the weigh-task 1216.

I claim:

1. A computer-implemented method for user-specific display of syndication feed entries, using a taxonomy, a foreground corpus of bookmarks, and a background corpus of feed entries, comprising:

a notice step, in which
a user-specific bookmark is received, said bookmark having a natural language description of a bookmark resource,
said natural language description corresponding to said bookmark is classified to determine a plurality of foreground topics,
said taxonomy is augmented to contain said plurality of foreground topics, as necessary,
said foreground corpus is augmented to contain a foreground accumulator corresponding to each of said plurality of foreground topics, as necessary, and
said bookmark is accumulated to said foreground accumulator corresponding to each of said plurality of foreground topics;

a publish step, in which
a syndication feed entry is received, said entry having a natural language description of an entry resource;
said natural language description corresponding to said entry is classified to determine a plurality of background topics,
said taxonomy is augmented to contain said plurality of background topics, as necessary, said background corpus is augmented to contain a background accumulator corresponding to each of said plurality of background topics, as necessary, and said entry is accumulated to said background accumulator corresponding to each of said plurality of background topics;

a weigh step, in which a user-specific weight is computed for said entry, said user-specific weight formed by aggregation of a plurality of per-topic weights, each of said plurality of per-topic weights corresponding to one of said plurality of background topics, and each of said plurality of per-topic weights increasing with increasing of said accumulation of said foreground accumulator corresponding to said one of said plurality of background topics, and each of said plurality of per-topic weights decreasing with increasing of said accumulation of said background accumulator corresponding to said one of said plurality of background topics; and a display step, in which a plurality of syndication feed entries are presented to said user in declining order of said user-specific weight.

* * * * *